No. 746,427. PATENTED DEC. 8, 1903.
F. R. WILLIAMS.
PLANIMETER.
APPLICATION FILED APR. 22, 1903.
NO MODEL.
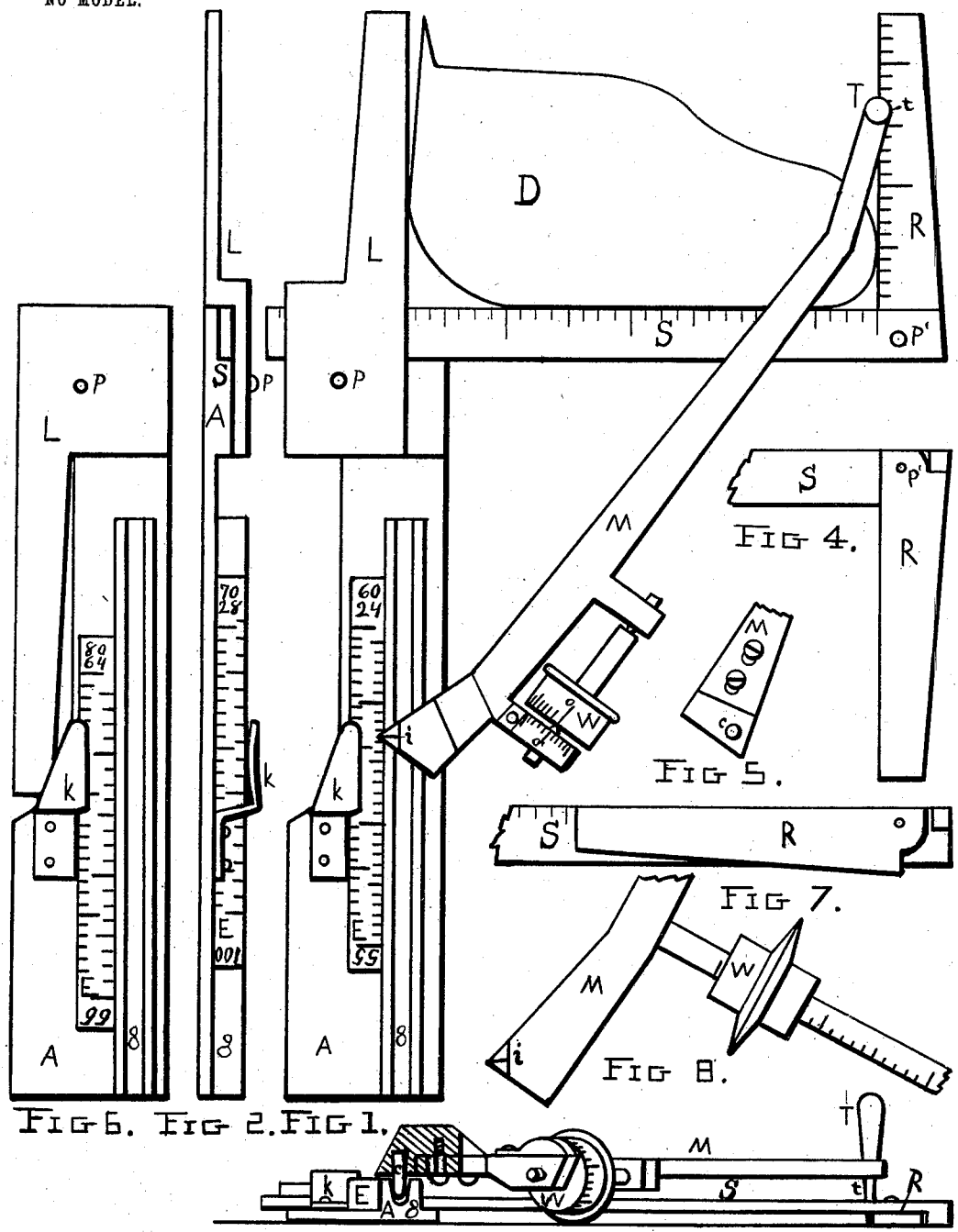
WITNESSES
E. Q. Williams
Geo. D. Curry
INVENTOR
Frank R Williams No. 746,427.

Patented December 8, 1903.

UNITED STATES PATENT OFFICE.

FRANK R. WILLIAMS, OF SYRACUSE, NEW YORK.

PLANIMETER.

SPECIFICATION forming part of Letters Patent No. 746,427, dated December 8, 1903.

Application filed April 22, 1903. Serial No. 153,740. (No model.)

*To all whom it may concern:*

Be it known that I, FRANK R. WILLIAMS, a citizen of the United States, and a resident of Syracuse, in the county of Onondaga, in the State of New York, have invented new and useful Improvements in Planimeters or Instruments for Measuring the Average Width of Irregular Figures, of which the following, taken in connection with the accompanying drawings, is a full, clear, and exact description.

This invention relates to improvements in planimeters or averaging instruments of that class more especially designed for measuring the mean height or pressure of indicator diagrams from steam-engines and for various sections, profiles, drawings of various figures, &c., in order to ascertain their area or mean average height thereof.

The object of this invention is to provide a compact portable form of instrument which is accurate, rapid, and convenient, that may be used upon a book, map, or other surface, and gives mean average height or equivalent pressure or other designation direct upon an index-scale without multiplying or comparing with other changeable devices.

With this and other objects in view this invention consists of certain novel features of construction, combination, and arrangement of parts as hereinafter described.

The construction of my instrument comprises a freely-turning wheel mounted near one end of a movable arm and with its axis parallel thereof, one end of said arm moving in a predetermined rectilinear path, while the other end of the arm is provided with a tracer-point, which is traversed about the form of the diagram. The body-frame supports a guideway for the arm, while its jaws furnish rectangular rulings which inclose the diagram, the outer corner thereof being useful as a definite starting-point and the outer jaw as a scale, preferably ruled in inches and decimals, for ascertaining the final height of the tracing-pointer. Another scale is provided adjustable in position and of flat or rectangular form with different readings upon its various sides corresponding to various denominations of indicator-springs or other desired designation to be observed from a pointer or index-mark upon the arm.

In the accompanying drawings, Figure 1 shows the instrument in use as having just completed tracing a diagram and the tracer having been moved up to bring the wheel to its zero. Figs. 2 and 3 show a side and end view, respectively. Figs. 4 and 5 show inverted portions of the jaw and arm, respectively. Figs. 6 and 7 show how the instrument is folded for packing. Fig. 8 shows the substitution of a sharp-edge wheel, which during operation moves sidewise along the shaft.

In the figures the letter A represents the main body, upon or within which is the grooved or other form of guideway $g$, and projecting above is the jaw L, one face of which is in line with the guideway $g$.

Sliding within the rectangular recess formed of the body A and the jaw L is the sliding jaw S, upon which is mounted the perpendicular jaw R. For portable convenience the jaw L is mounted upon the base A by the pivot $p$, and the jaw R is mounted upon the base-slide S by pivot $p$ or otherwise removably secured. The jaw L is in line with the guideway $g$ and the slide S is at right angles thereto and the jaw R at right angles to the slide S and parallel with the jaw L and guideway $g$. Therefore the inner faces thereof form a rectilinear straight line inclosure which is useful in several ways. The slide S and jaw R are preferably marked in inches and fractions thereof or may have other scales applied thereto.

The tracing-arm M is provided at one end with a tracer-point $t$ and handle thereof T and at the other end, which I term the "pivoted" end, with a guide-pin $c$ or other slide, moving on the guideway $g$, allowing the arm to reciprocate longitudinally of the guideway and to swing laterally as the tracer-point may move over a diagram. Between the point $t$ and the pin $c$, near the pivoted end, the arm M carries a measuring-wheel W, which is provided with a zero-mark and preferably graduated on its circumference corresponding to square inches on the diagram and coöperates with a fixed point or scale on the arm. The wheel W is journaled freely upon its axis and in parallel to a line of the arm between the pin $c$ and tracer $t$. This wheel registers by means of a combined sliding and rolling movement. It scrapes along the paper for longitudinal motion of the tracer-arm and rotates for movements perpendicular thereto. In operation the horizontal movements of the tracer just balance; but the vertical movements of the tracer record rotary movements of the wheel proportional to the angle which the arm bears to the guideway $g$ and jaw L, which indicates the area traced over, and similarly the tracer being moved along the jaw R at the extreme length of the diagram will indicate the same area by a vertical movement which is equal to the height of an equal rectangle and which is the mean or average height of the diagram. The pivoted end of the arm M is weighted sufficiently to hold it in position and give proper friction to the wheel W.

Slidable upon the base adjacent and parallel to the guideway G is the scale E, which is secured by the spring-clip $k$ or otherwise, so as to be easily adjustable vertically to conform with different lengths of diagrams, is preferably of flat or rectangular form, and provided upon its sides with a series of different scales, corresponding to various denominations of indicator-springs or other desired designations to be observed from a pointer or index-mark $i$ upon the arm. The scale E may be turned upon any of its sides and also reversed, thus presenting several facings for scale graduations, also instantly slipped out and replaced by another, thus affording the greatest facility and convenience.

The operation is as follows: In using the instrument the parts are connected and set up for use as shown in Fig. 1, with a paper or other friction material under the wheel, and the diagram is placed with its form exactly inclosed within the jaws L S R, the air-line being coincident or parallel to the slide S and the ends of the diagram just reaching the jaws L R. Then place the tracer-arm with its point at the corner S R. A slight dot may be made at this point. Next adjust the wheel W to zero, also the sliding scale E up or down to its zero. Now move the tracer directly upward until it reaches some part of the diagram-line. Then follow the diagram-line just once around. When against the jaw R, move directly up or down until the wheel reaches zero. Another dot may be made here. Now read the mean average height M E P upon the jaw R or upon the scale E or between the dots or move the tracer directly down to the corner S R, when the wheel will read square-inches areas. It is usual to traverse the diagram in a right-handed direction; but this may be reversed for any reason. During this operation the instrument should be held carefully by hand; but obviously it may be temporarily or permanently affixed to a suitable board or table.

The accuracy may be tested as follows: Of parallelism of the wheel, by moving the tracer up and down against the jaw L; of rotative accuracy, by moving the tracer back and forth against the slide S, also up and down against the jaw E; its area reading, by setting the jaws an exact distance apart and placing the tracer against the jaw R, moving it up or down an observed height, noting that the measuring-wheel moves over graduations corresponding to the area of the length of between the jaws multiplied by the height moved by the tracer. Its area readings may be corrected for wear of the wheel by lengthening the arm M in the adjustable extension shown. However, its direct reading of height, or M E P, is unaffected by variations of diameter or roundness of the wheel or of its graduations.

Although I prefer a measuring-wheel with a smooth edge, as described, I may use a wheel having a sharp edge and which during operation moves sidewise upon or with its shaft at right angles to the line of the arm and whose movement is registered upon or by its shaft or other suitable index.

Portions may be used without the whole or equivalent modifications and various changes in the form and details may be made without departing from the advantages of this invention.

I claim—

1. In a planimeter a body-frame, diagram-jaws thereon, one of said jaws being fixed upon the body, and the other adjustably connected to the body so as to be movable thereon toward and from the fixed jaw, the whole being constructed self-supporting independently of a base or table, substantially as described.

2. In a planimeter comprising the combination of the body A, with guide $g$, stationary jaw L, attached by pivot $p$; adjustable slide S, with jaw R, attached by pivot $p'$; and the tracer-arm M, one end provided with a tracer, the other traversing the guideway $g$, and said arm provided with a recording-wheel, substantially as and for the purpose described.

3. In a planimeter the combination of the body A, with guide $g$, stationary jaw L, and adjustable jaw S, R, the upright portions of which coincide with the ends of the diagram, and the horizontal part S, a base for the atmospheric line thereof and the tracer-arm, one end provided with a tracer, the other traversing the guideway $g$, and said arm provided with a recording-wheel, substantially as and for the purpose set forth.

4. In a planimeter the jaws L, R, thereof forming a definite margin for the diagram, and the jaw R, being furnished with a scale for reading the height of the tracer direct thereof.

5. In a planimeter the jaws L, S, R, forming a rectangular inclosure for the diagram, the jaw R, being furnished with a scale for reading the height of the tracer direct, as set forth.

6. In a planimeter the jaws L, S, R, forming a rectangular inclosure for the diagram, the slide S, thereof being furnished with scale-markings, substantially as shown.

7. In a planimeter the jaws thereof forming a rectangular inclosure for the diagram, the corner thereof forming a definite datum-point, and the jaw R, being furnished with a scale for reading the height of the tracer, substantially as described.

8. A planimeter of the rectangular-jaw type, with a scale upon its measuring-jaw, its zero registering with the corner of the rectangle, as and for the purpose shown and described.

9. A planimeter having a guideway, a reversible rectangular scale adjustably secured upon the base adjacent to the guidway, and a pointer or index-mark upon the tracer-arm registering with the scale and coöperating with the tracing-point upon the diagram, substantially as specified.

10. In a planimeter, a guideway, a rectangular scale removably and adjustably secured adjacent to the guideway, with means for securing the same in adjusted position, and a tracer-arm having a pointer or index-mark thereon traversing the scale while the tracing-point describes the diagram, substantially as shown.

11. In a planimeter the combination of a body provided with a guideway, a reversible rectangular scale adjacent to said guideway, a tracer-arm carrying a measuring-wheel, and provided at one end with a tracing-point, and at the other end with a pin traversing the guideway, and a pointer or index-mark upon the arm registering with the scale, substantially as and for the purpose set forth.

12. In a planimeter a rectangular scale having various scale graduations upon its different sides, removably and adjustably held upon the body adjacent to said guideway, and a pointer upon the tracer-arm registering with said scale, when the tracing-point has described the diagram substantially as and for the purpose set forth.

13. In a planimeter a body with rectangular jaws, a tracer-arm, one end provided with a tracing-point, and the other end controlled by a guideway, and a rectangular scale adjacent said guideway, adjustably secured by the clip $k$ and having various scale denominations upon its faces, substantially as and for the purpose shown.

FRANK R. WILLIAMS.

Witnesses:
E. Q. WILLIAMS,
GEO. D. CURRY.